United States Patent [19]

O'Connell et al.

[11] Patent Number: 4,791,280

[45] Date of Patent: Dec. 13, 1988

[54] METHOD OF OPERATING A SECURITY DEVICE, SECURITY DEVICE AND DATA CARRIERS FOR USE IN THE METHOD

[75] Inventors: John O'Connell, Halesowen; Alan Webster, Birmingham; Roy S. Jefferies; Hugh Trevor-Jones, both of Bridgnorth, all of United Kingdom

[73] Assignee: Lowe and Fletcher Limited, Burmingham, England

[21] Appl. No.: 26,699

[22] PCT Filed: Jul. 9, 1986

[86] PCT No.: PCT/GB86/00394

§ 371 Date: Feb. 17, 1987

§ 102(e) Date: Feb. 17, 1987

[87] PCT Pub. No.: WO87/00233

PCT Pub. Date: Jan. 15, 1987

[30] Foreign Application Priority Data

Jul. 9, 1986 [GB] United Kingdom ................ 8517347

[51] Int. Cl.4 ................................................ G06K 7/01

[52] U.S. Cl. ................................. 235/382.5; 235/382; 235/461; 235/489; 340/825.31; 70/278

[58] Field of Search ............................. 235/382, 382.5; 340/825.31; 70/278

[56] References Cited

U.S. PATENT DOCUMENTS

| | | | |
|---|---|---|---|
| 3,688,269 | 8/1972 | Miller | 235/382 |
| 3,821,704 | 6/1974 | Sabsay | 235/382.5 |
| 4,213,118 | 7/1980 | Genest et al. | |
| 4,283,710 | 8/1981 | Genest et al. | 235/382.5 |
| 4,542,465 | 9/1985 | Stockburger et al. | 235/382 X |
| 4,594,663 | 6/1986 | Nagata et al. | 235/382.5 X |

FOREIGN PATENT DOCUMENTS

| | | |
|---|---|---|
| 0043270 | 1/1982 | European Pat. Off. . |
| 0122244 | 10/1984 | European Pat. Off. . |
| 1456138 | 11/1976 | United Kingdom . |
| 8002711 | 12/1980 | World Int. Prop. O. . |

*Primary Examiner*—David L. Trafton
*Attorney, Agent, or Firm*—Marshall, O'Toole, Gerstein, Murray & Bicknell

[57] ABSTRACT

A lock has means (15,16) for reading from a key (11) a binary encoded number. If the number read from the key is a predetermined number, the lock will store in a memory (19) a further number read from a further key applied immediately after withdrawal of the first key. The device will then recognize the second key, when applied subsequently.

11 Claims, 2 Drawing Sheets

Figure 1:
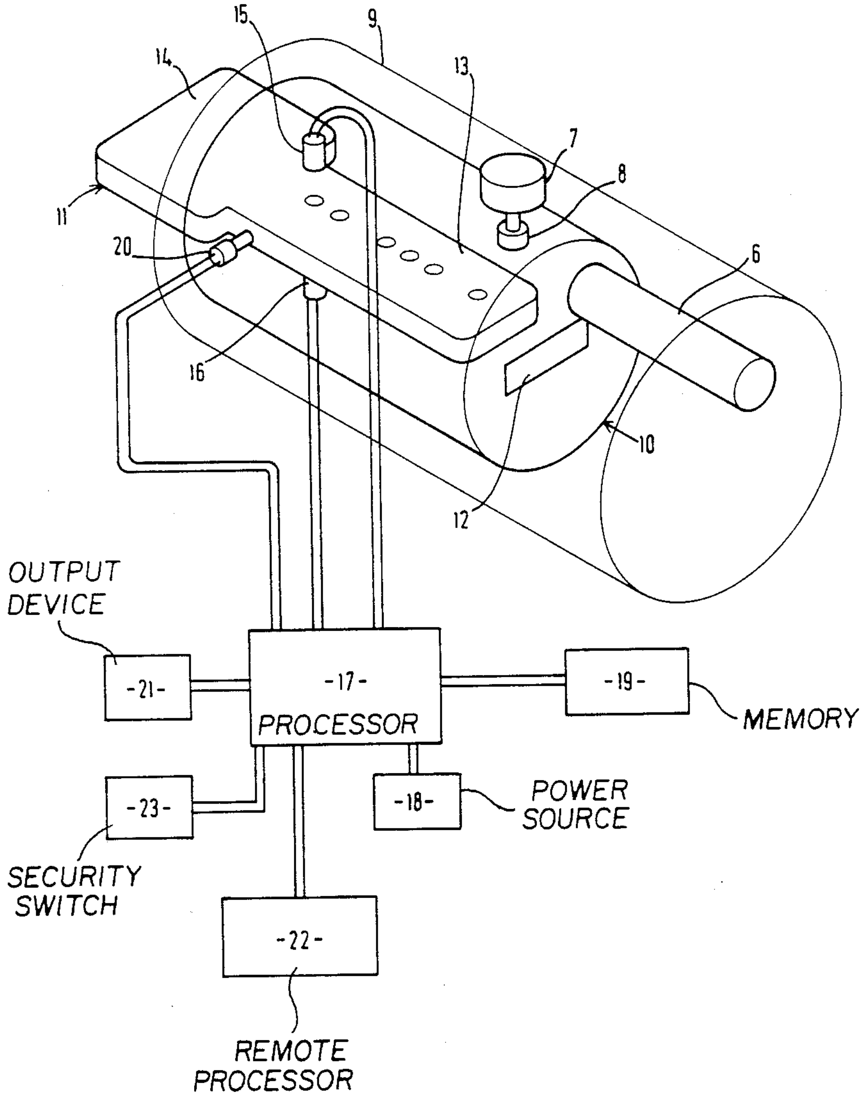

METHOD OF OPERATING A SECURITY DEVICE, SECURITY DEVICE AND DATA CARRIERS FOR USE IN THE METHOD

A first aspect of the present invention to a method of operating a security device having a memory. A variety of security devices having electronic memories have been proposed. Examples of these include locks for controlling the opening of doors and other closure members, devices for controlling the operation of alarm systems, postage meters, cash dispensers, vehicles and other machinery. Generally, authorised persons are provided with respective data carriers bearing an encoded number, or are informed of a number to be applied to the security device. Several persons may be provided with the same number. Alternatively, different persons may be provided with different numbers, in order that the security device can distinguish different users and, possibly, maintain a record of the persons who have gained access to an enclosure or have used equipment. The number applied by a person to the security device, by means of a data carrier or otherwise, is compared with a number stored in the memory of the device. If these numbers are found to correspond, access or use is permitted.

There is a requirement for changing the number or numbers in the memory of such a security device, for example when authorisation of a particular person is revoked, or for initial storing of numbers in the memory by persons not concerned with manufacture of the security device.

In U.S. Pat. No. 4,213,118, GB No. 1,456,138, EP No. 122244 and EP No. 43270, there are described security devices having memories, the contents of which can be changed by use of a card or other information carrier. When the contents of the memory are such that the security device recognises a first information carrier as a valid carrier and provides a release signal when that first carrier is introduced into the security device, the security device will also recognise a second carrier which presents to the security device information having a predetermined relation with information presented by the first carrier. Application of the second carrier to the security device is accepted by the security device as an instruction to replace data in the memory corresponding to the first carrier by data corresponding to the second carrier. This results in the first carrier no longer being recognised as a valid carrier and recognition of the second carrier as a valid carrier.

In WO No. 80/02711, there is disclosed a security device with a permanent memory for storing data corresponding to a lock-identity key. The security device is programmed to store data which read from a second key, after data has been read from the lock identity key. This introduces the second key as a valid key and subsequent application of the valide key to the security device results in the generation of a release signal. The lock identity key can also be used for instructing the security device to erase from its memory data corresponding to keys other than the lock identity key.

The system described in WO No. 80/02711 has the advantage that a predetermined relationship between the lock identity key and user keys is unnecessary. Furthermore, several, different user keys can be recognisable by the security device as valid keys concurrently. However, the system suffers from the disadvantage that the lock identity key must be available and be used for changing the contents of the memory of the security device. Data corresponding to that presented by the lock identity key is permanently stored in the security device so that if the data presented by the lock identity key is compromised, for example by loss of the lock identity key, the security of the system is lost and can be restored only by replacement of hardware.

According to a first aspect of the present invention, there is provided a security system comprising first, second, third, fourth and subsequent data carriers, each presenting a respective encoded number, and a reading device for reading said numbers from the carriers, comparing numbers read from the carriers with numbers stored in the device and for providing an acceptance signal when a number read from a data carrier is found to be acceptable, wherein the reading device includes a memory for storing said data, a first of said carriers is able to introduce a second of the carriers to the device and the second of the carriers, when it has been introduced to the device, is able to introduce the third and subsequent carriers to the device whilst both the first and second data carriers remain capable each of introducing further data carriers to the reading device.

The second data carrier of a system in accordance with the first aspect of the invention can be used to introduce to the reading device a further data carrier, in place of the third or a subsequent data carrier which, until the further data carrier is introduced, is an acceptable data carrier but is no longer acceptable, once the further data carrier has been introduced in its place. Accordingly, the second data carrier must be available for use for changing the contents of the memory in the event of loss of the third or a subsequent data carrier or other circumstances which requires one data carrier to be rendered unacceptable and a further data carrier to be used in its place. However, should the second data carrier be lost or doubts be raised as to whether the second data carrier has at least temporarily fallen into unauthorised hands, then the first data carrier can be used to introduce a further data carrier to the reading device in place of the second carrier, so that the second data carrier will thereafter be incapable of introducing subsequent data carriers. In this way, the security of the system can be restored without changing hardware. The first data carrier is required only under very exceptional circumstances and can be stored in a relatively inaccessible place, for example a bank vault.

According to a second aspect of the invention, there is provided a method of operating a security device having a memory, wherein a first encoded number is compared with a first number in the memory and is found to correspond to said first number, a second encoded number is applied to the device immediately after application of the first encoded number and is stored in the memory of the device, together with the first number, there is applied to the device, immediately after application to the device of the second encoded number, a third encoded number, the third number is stored in the memory of the device together with the first and second numbers and wherein, upon the subsequent application of a number to the device, the applied number is compared with the first, second and third numbers.

By storing all of the first, second and third numbers in the memory, the second number is available for use subsequently in the replacement of the third number by a further number and the first number is available for use subsequently in replacement of the second number by a further number.

According to a third aspect of the invention, there is provided a security device having receiving means for receiving a data carrier, reading means for reading data from a data carrier received by the receiving means, a memory for storing data read by the reading means and a processor programmed to compare with a first number stored in the memory a number read from a first data carrier by the reading means, to store in the memory, if said number read from the first data carrier agrees with the first number stored in the memory, a second number read by the reading means from a second data carrier or otherwise applied to the processor within a predetermined period from reading of or from withdrawal of the first data carrier, to store in the memory with the first and second numbers a third number read from a third data carrier applied to the receiving means within a predetermined period from application to the processor of the second number and to compare numbers read subsequently by the reading means with the first, second and third numbers.

In a method in accordance with the invention, there may be no predetermined relation between the first, second and third encoded numbers. Thus, a third encoded number selected at random may be introduced into the memory of the device and allocated to a newly authorised user.

The encoded numbers may be applied to the security device by means of respective data carriers. Alternatively, at least one of the encoded numbers may be transmitted to the security device from a data processor. Such data processor may be permanently wired to the security device.

A number applied to the security device may be transmitted to a remote processor, for example to be included in a record of applied numbers.

In a method in accordance with the second aspect of the invention, each number applied to the security device after the third encoded number has been entered in the memory may be compared with numbers in a series of numbers which includes the third encoded number. Thus, introduction of the third encoded number into the memory may introduce to the security device a series of related numbers which can be generated by the security device from the third encoded number without other members of the series being applied to the device.

Storing of the second encoded number in the memory may be dependant upon application of the second encoded number to the device within a limited period following application to the device of the first encoded number.

Figure 2:
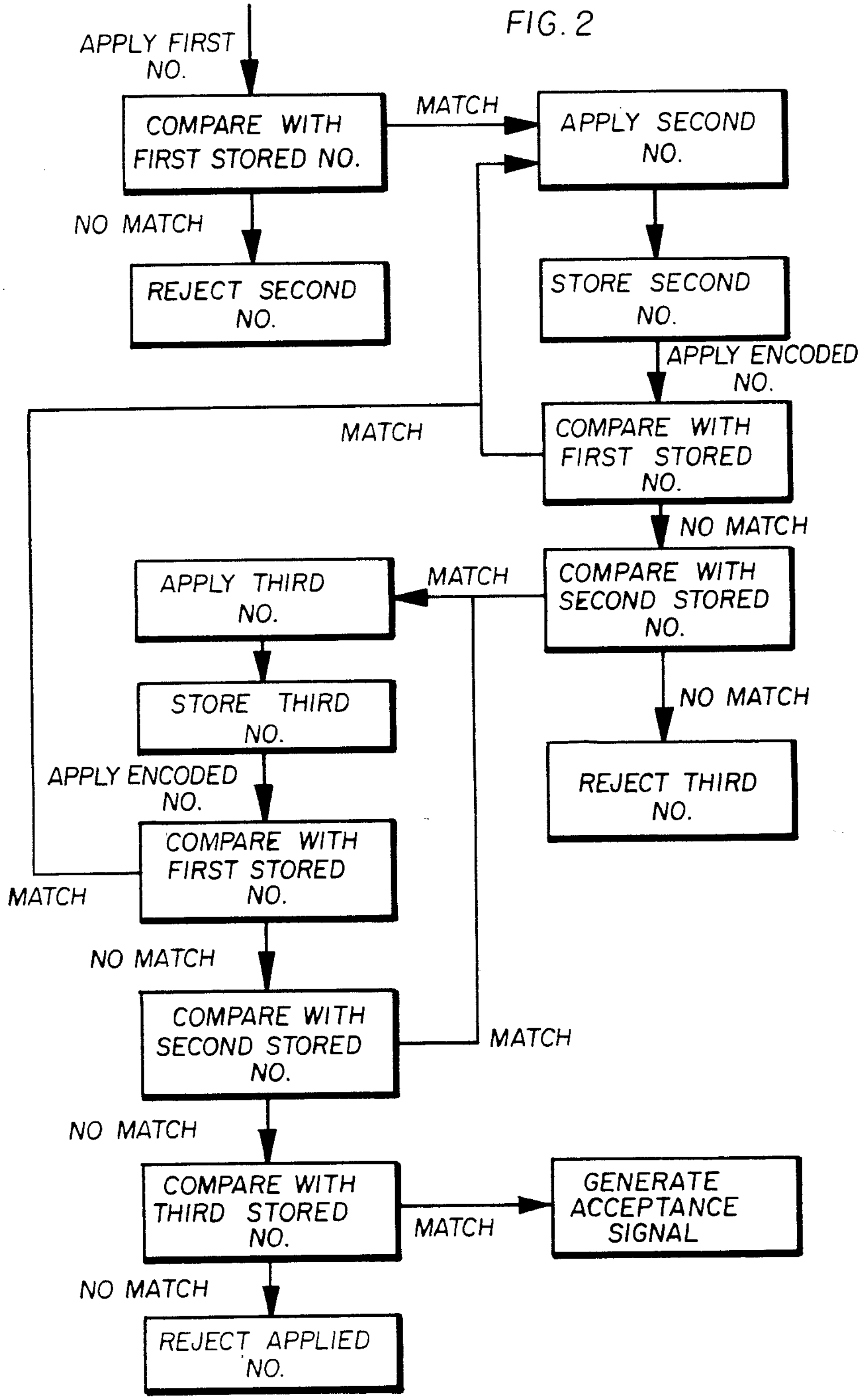

Examples of a method and of a security device in accordance with the invention will now be described, with reference to the accompanying drawings, in which FIG. 1 is a diagrammatic representation of the security device together with a data carrier, and FIG. 2 is a flow chart illustrating the steps of the method of the invention.

The security device illustrated in the accompanying drawing comprises receiving means 10 for receiving a data carrier 11 which, in the example illustrated, has the form of a key. The receiving means 10 defines an elongated slot 12 for receiving a shank 13 of the key. Travel of the shank 13 along the slot may be limited by abutment of a handle 14 of the key with an end of the receiving means 10.

As shown in the drawing, the receiving means 10 may have the form of a cylinder and be mounted in a hollow body 9 for turning relative thereto when the appropriate key is applied, generally in the manner of a cylinder lock. Thus, there may be provided a locking element 8 which can lie partly in a recess formed in the peripheral surface of the receiving means 10 and partly in a recess formed in an internal surface of the body 9, to obstruct relative rotation. Electrically energisable means 7 is mounted in the body 9 for moving the element 8 between the locking position illustrated in the drawing and a releasing position, in which the element is retracted from the receiving means 10. Additionally or alternatively, the receiving means may be provided with tumblers operated mechanically by the key in a known manner. The receiving means may have a mechanical output element 6 for transmitting torque to a bolt, switch or other controlled device.

Alternatively, the receiving means 10 may be non-rotatably mounted in a body such as the body 9.

Reading means is provided in the receiving means 10 for reading information from the key 11. In the example illustrated the reading means comprises an emitter 15 of infra-red radiation and a detector 16 for detecting radiation emitted by the emitter 15. The emitter and detector are mounted in the receiving means 10 at opposite sides of the key-slot 12 so that the keyshank 13 is scanned by the beam of radiation when the key is introduced into the receiving means.

The emitter 15 and detector 16 are connected electrically with an electronic data processor 17 having a battery or other source of electrical power 18. With the processor 17, there is also associated an electronic memory 19.

A mechanically operated switch 20 is provided in the receiving means 10 to respond to introduction of the keyshank 13 into the slot 12 by providing to the processor 17 a signal which initiates energisation of the emitter 15 and detector 16. The keyshank 13 bears an encoded first number represented by a row of holes through which the beam of infra-red radiation can pass. As the keyshank is moved into the key-slot 12, a series of pulses is fed to the processor 17 from the detector 16. These pulses represent the encoded number in binary code.

It will be understood that the data borne by the key 11 may be represented by more than a single row of holes in the keyshank. Furthermore, there may be provided a row of evenly spaced holes constituting a clock-track which controls interrogation by the processor 17 of the detector 16. The reading means comprises an emitter detector pair for each row of holes in the keyshank. Whilst a keyshank having data represented in the form of holes has been illustrated, for convenience, it will be understood that the data may be represented in other forms, for example opaque marks in a transparent window or magnetic poles. In the latter case, the reading means would be responsive to the magnetic field of the key. Furthermore, the key may define formations, the presence of absence of which is sensed by the reading means of the security device. In this latter case, the reading means would be as disclosed in our co-pending International application PCT/GB No. 85/00571 and the key also may be described in the aforesaid unpublished application.

During or subsequent to manufacture of the security device, a first number is applied to the memory 19. A number is preferably represented by hardware or firmware and may be applied to the memory by, for example, establishing or destroying electrically conductive connections with the memory. The first number cannot be erased from the memory of the device.

The processor 17 is programmed to compare with the first number in the memory a number read by the reading means from a key applied to the receiving means. If the applied number is found to correspond to the first number in the memory, the processor is prepared to receive a second number from the reading means. The processor may also provide a signal to an output device 21 and/or to a remote processor 22. The output device 21 may be a solenoid for moving or controlling movement of a bolt or other fastening element used for securing a closure member. Alternatively, the output element 21 may be a dispenser which is controlled by the security device or means for controlling energisation of the device 7.

The processor 17 is programmed to store in the memory 19, together with the first number, a second encoded number if such second encoded number is applied at an appropriate time. In a case where the first encoded number is applied to the security device on a data carrier introduced into the receiving means, and the second encoded number is applied in some alternative way, for example transmitted from the remote processor 22, then the second number may be stored in the memory provided it is received by the processor 17 whilst the data carrier is still in the receiving means 10. In a case where the first number is applied to the security device by the remote processor 22, then the second number may be stored in the memory only if received by the processor 17 within a predetermined period following reception of the first number.

The second encoded number may be borne by a second key, in which case the second key would be applied to the receiving means to enable the second encoded number to be read and transferred to the processor and to the memory. If no second number is applied within a predetermined period, preferably less than 1 minute, then the processor 17 resumes a condition in which it will not transfer to the memory 19 a second applied number.

In a case where both the first and second encoded numbers are intended to be borne by respective number carriers, the processor 17 is programmed to store in the memory 19, together with the first data, the second encoded number, provided the second encoded number is read by the reading means within a predetermined period following either reading of the first encoded number or withdrawal of the data carrier from the key slot 12. If no second number is applied within this period, preferably less than one minute, then the processor 17 resumes a condition in which it will not transfer to the memory 19 a second applied number.

The processor 17 is preferably programmed to recognise, in addition to the second encoded number, each member of a series of numbers which includes the second encoded number. This series may, for example, comprise a limited set of consecutive numbers commencing with the second encoded number. Subsequent application to the security device of any one of this series of numbers may be accepted by the processor 17 as an instruction to transfer to the memory 19 any further number, called herein the third number, applied to the device within a limited period, for example a period of ten seconds. The processor may also be programmed to provide a signal to the output element 21 whenever this third number is subsequently applied to the device, whilst this number remains in the memory 19. The procedure used for storing the third number in the memory may be used to replace that number in the memory by a different number.

It will be understood that, whilst the manufacturer of the security device will normally have knowledge of the first data stored in the memory 19, the manufacturer will not necessarily have knowledge of any other number stored in the memory. Selection of further numbers and storing of those numbers in the memory can be carried out by a user, after installation of the security device, so that knowledge of the appropriate numbers for operation of the security, can be restricted to the user. The manufacturer may supply to the user a variety of keys bearing respective different encoded numbers and the user may select certain of these keys for use with the security device. Freedom for the user to select certain keys from a bulk supply of keys provided by the manufacturer gives improved security, as compared with systems described in the prior art, where successive keys must bear a predetermined relation with one another.

While we prefer that the processor 17 be programmed to decide whether, upon application of a particular number to the security device, an output will be provided to the output element 21 or the applied number will be transferred to the memory 19, the processor may alternatively be so programmed that it merely transmits the applied number to the remote processor 22 and the latter processor takes the necesssary decision and sends an appropriate instruction to the processor 17. It will be understood that the processor may be programmed to provide an acceptance signal to the output element 21 whenever the first number is applied to the processor, whenever the second number is applied to the processor and/or whenever the third number is applied to the processor. Typically, neither application of the second number nor application of any member of the series of which the second number is the first member results in the provision of an acceptance signal to the output element 21. In a case where the security device is a door lock, the keys in the series beginning with the second key are used only for introducing third and subsequent keys to the lock and are not themselves used for releasing the lock. Release of the lock can be achieved by applying to the receiving means 10 either the first key or the third or a subsequent key which has been introduced by means of a key in the series beginning with the second key. The first key and the third key can be used on an infinite number of subsequent occasions to unlock the door.

When the security device is brought into use, the first key is applied to the receiving means 10 and the first number is read from the first key and applied to the processor 17. The processor compares the read number with the first number stored in the memory 19 and finds that these correspond. The first key is withdrawn and the second key is immediately applied to the receiving means 10, the second number being read from the key and applied to the processor 17. Since the number read from the first key corresponds to the first number in the memory, the processor adds the second number to the memory.

A third key, bearing a third number, is applied to the receiving means 10 immediately after the second key has been applied, read and withdrawn. This may be the first occasion on which the second key has been applied or a subsequent occasion on which the second key is applied. Since the number read from the second key is found by the processor to correspond with the second number stored in the memory 19, the processor accepts the third number read from the third key and writes that number also in the memory 19. The third key can then be withdrawn or can be used to turn the receiving means, where the letter is turnable.

If the third key is subsequently applied to the receiving means, the number read from the third key will be compared with the first number in the memory 19, and found not to correspond, and will be compared with the third number stored in the memory 19. When the processor finds that the number read from the key corresponds with the third number in the memory 19, it provides ann acceptance signal to the output element 21. In a case where the receiving means is turnable, this releases the receiving means for turning by means of the key.

If, on a subsequent occasion, there is applied to the receiving means 10 a key presenting a number which is a member of the limited series of which the second number forms a first member, the microprocessor recognises that number by comparison with the second number in the memory 19 and prepares to accept any further number applied immediately thereafter, the further number being written into the memory 19 as an acceptable number, application of which to the processor 17 will result in an acceptance signal being provided to the output element 21. In this way, each of the keys in the series which begins with the second key can be used to introduce to the device a further key as an acceptable key. If this procedure is repeated to introduce a different key, the number read from that different key would be written into the memory 19 in place of a previously acceptable number.

We call the first key a lock identity key, because that key presents a number by which the lock is identified. In a case where a number of security devices are provided in a single building, some or all of these devices may have the same lock identity number. We call the keys which present the numbers in the series beginning with the second number set keys. These keys are used for introducing further keys to the security device. The series of set keys is introduced to the device by the lock identity key.

We call the third key and other keys introduced to the security device by means of a set key user keys. In general, each set key may be capable of establishing in the memory 19 at any one time a single user key. Although each user key is introduced by a particular set key, the number presented by each user key may be unrelated to the number presented by the set key which introduces that user key. A user key can be rendered unacceptable and replaced by a further user key only by use of the set key which was used to introduce that user key.

In a case where the security device is a door lock, there is provided at the internal face of the door a switch 23 or other means for instructing the processor 17 to maintain a secure condition of the lock, even when one or any of certain ones of the user keys is applied. However, the user key which is introduced by a specific set key, for example the second set key of the series, is recognised by the processor 17 as over-riding the switch 23 so that this particular key can be used to gain entry to the room concerned, even when the privacy switch 23 is set.

During manufacture, the processor 17 can be configured to establish a series of user keys when a first member of that series is introduced by a specific set key, for example the key hereinbefore described as the second key. The number presented by each successive key of the series of user keys is related to the number presented by the preceding key of that series in a predetermined manner, so that the processor 17 can recognise the next key of the series, write the number presented by that key in the memory 19 and erase from the memory the number of the immediately preceding key of the series. This enables the contents of the memory to be changed without use of any set key and is useful for keys supplied to be changed without use of in an hotel.

Alternatively, the processor 17 may be configured during manufacture of the security device so that the second can introduce only a single user key, not a series of user keys. This configuration of the processor is used in a case where automatic indexing of the memory 19 without use of a set key is not required.

The processor 17 may also be programmed to store in the memory information concerning numbers read by the reading means, for example the date and/or time when each number is read. This record may contain information concerning only applications to the security device of those numbers which cause an output signal to be provided to the device 21. Alternatively, information concerning all applied numbers which are read can be stored. This memory may be interrogated by the remote processor 22, in order to extract from the memory information concerning the numbers which have been read by the security device. Alternative provision may be made for extracting such information from the memory, for example there may be provided terminals which are accessible only when, for example, a door controlled by the security device is open, these terminals being connected with the processor 17 to facilitate use of a portable microprocessor to interrogate the memory. The arrangement may be such that information can be extracted from the memory only when there is present in the receiving means 10 a data carrier bearing a number which is recognised by the security device, for example a number which causes the output signal to be provided to the output device 21.

The features disclosed in the foregoing description, or the accompanying drawings, expressed in their specific forms or in terms of a means for performing the disclosed function, or a method of process for attaining the disclosed result, as appropriate, may, separately or any combination of such features, be utilised for realising the invention in diverse forms thereof.

What is claimed is:

1. A security system comprising first, second, third, fourth data carriers and subsequent data carriers, each presenting a respective encoded number, and a reading device for reading said numbers from the carriers, comparing numbers read from the carriers with numbers stored in the device and for providing an acceptance signal when a number read from a data carrier is found to be acceptable, wherein the reading device includes a memory for storing said data, a first of said carriers is able to introduce a second of the carriers to the device and the second of the carriers, when it has been introduced to the device, is able to introduce the third and subsequent carriers to the device whilst both the first and second data carriers remain capable each of introducing further data carriers to the reading device.

2. A method of operating a security device having a memory, wherein a first encoded number is compared with a first number in the memory and is found to correspond to said first number, a second encoded number is applied to the device immediately after application of the first encoded number and is stored in the memory of the device, together with the first number, there is applied to the device, immediately after application to the device of the second encoded number, a third encoded number, the third number is stored in the memory of the device together with the first and second numbers and wherein, upon the subsequent application of a number to the device, the applied number is compared with the first, second and third numbers.

3. A method according to claim 2 wherein there is no predetermined relation between the first, second and third encoded numbers.

4. A method according to claim 2 wherein at least one of said numbers is applied to the device by means of a separable data carrier which is applied to the device and is subsequently removed therefrom.

5. A method according to claim 2 wherein a subsequently applied number is compared with a series of numbers, which series includes said second number.

6. A method according to claim 2 wherein there is a subsequently applied to the security device a fourth number which bears a predetermined relationship to the third number, the fourth number is entered in the memory of the device and the third number is deleted from the memory.

7. A method according to claim 2 wherein the third number is applied to the device by means of a separable data carrier which is applied to the device and then removed therefrom and wherein the data carrier is applied once more to the security device and, after being read by the security device, is used to transmit torque from a user to a mechanical output element of the security device.

8. A security device having receiving means for receiving a data carrier, reading means for reading data from a data carrier received by the receiving means, a memory for storing data read by the reading means and a processor programmed to compare with a first number stored in the memory a number read from the first data carrier by the reading means, to store in the memory, if said number read from the first data carrier agrees with the first number stored in the memory, a second number read by the reading means from a second data carrier or otherwise applied to the processor within a predetermined period from reading of or from withdrawal of the first data carrier, to store in the memory a third number applied by a third data carrier, if the third data carrier is applied immediately after the second number has been applied to the processor, and to compare a number subsequently read by the reading means with the first, second and third numbers.

9. A security device according to claim 8 wherein the processor is also programmed to compare a number read by the reading means subsequent to storing of the second number in the memory with said first number and with each member of a series of numbers comprising said second number and members logically related to the second number.

10. In combination, a security device according to claim 8 and a plurality of data carriers, wherein a first of the data carriers carries the first number and others of the data carriers carry respective numbers which are different from the first number and from numbers carried by the other data carriers.

11. A combination according to claim 9 wherein the data carriers are keys and the security device is a lock adapted to receive the keys in turn and to transmit mechanical drive from at least certain of the keys to an output element of the lock.

* * * * *